United States Patent Office 3,051,205
Patented Aug. 28, 1962

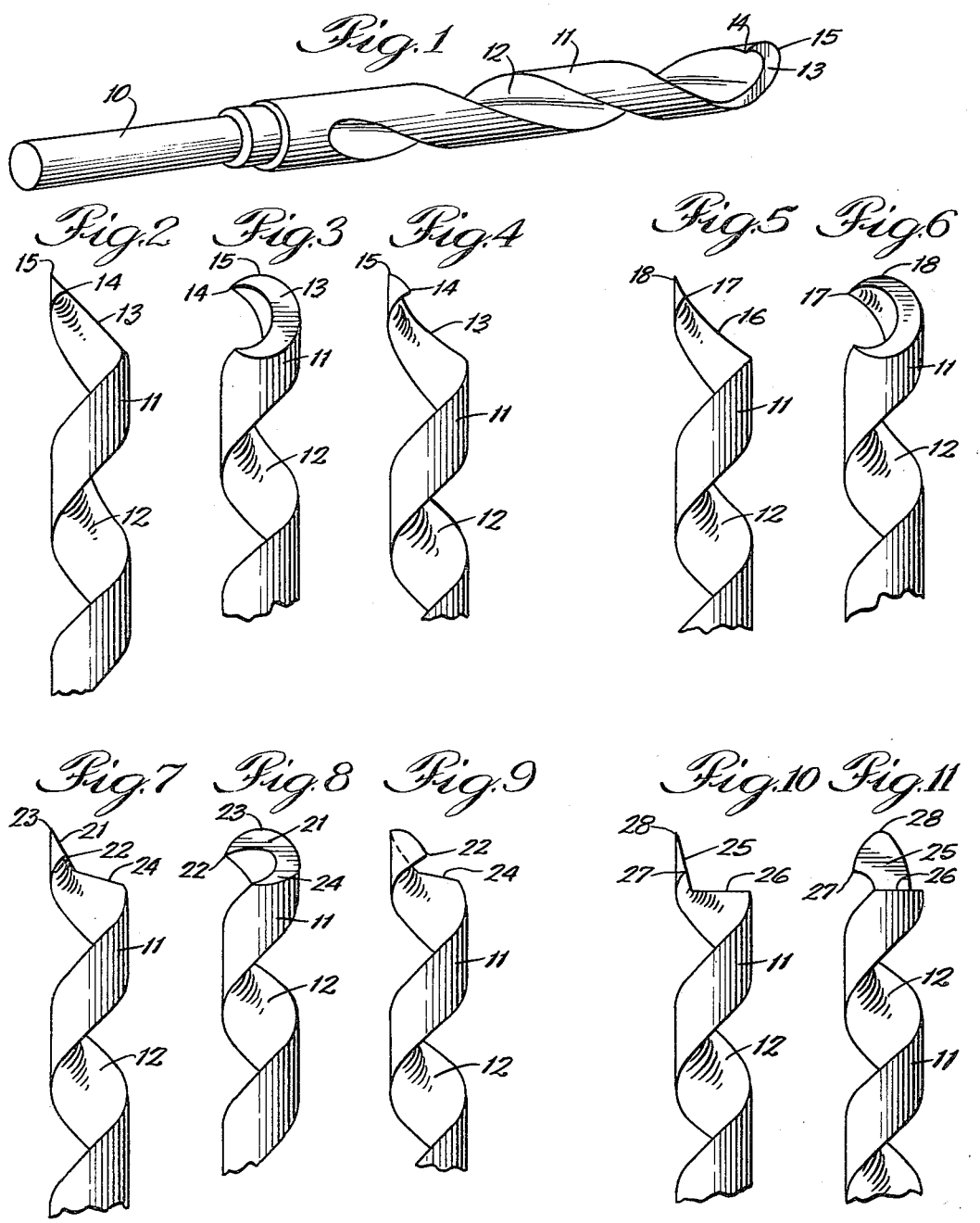

3,051,205
TWIST DRILL
William J. Kallio, Glen Ellyn, Ill., assignor to United-Greenfield Corporation, Chicago, Ill., a corporation of Delaware
Filed May 25, 1959, Ser. No. 815,605
2 Claims. (Cl. 145—117)

This invention relates to twist drills and more particularly to drills for use with relatively soft fibrous or flaky materials, such as acoustical title.

The drilling of relatively soft or flaky materials in the manufacture of acoustical tile and similar products has been an extremely difficult problem and a number of different solutions for it have been proposed. To be satisfactory for this use, a drill must be capable of drilling clean holes rapidly must have a relatively long life and must be capable of being resharpened easily and quickly.

These requirements are not easy to satisfy and drills as heretofore proposed have generally fallen short of a complete answer to one or more of the requirements.

It is one of the objects of the present invention to provide a twist drill which satisfies all of the requirements for drilling soft fibrous or flaky materials, such as acoustical title.

Another object is to provide a twist drill which is very simple in construction so that it is easy to manufacture and extremely easy to resharpen.

According to a feature of the invention, the cutting tip of the drill is formed by a surface which may be flat, slightly curved, or composed of two connecting surfaces, and which intersects the cylindrical outer surface of the drill body at an acute angle to the drill axis at a point trailing the intersection of such surface with the leading edge of the flute in the body. This forms a cutting spur at the outermost end of the drill which scribes the material so that the point formed by intersection of the end surface with the leading edge of the flute picks up the scribed material and directs it smoothly into the flute.

The above and other objects and features of the invention will be more readily apparent from the following description when read in connection with the accompanying drawing, in which:

FIGURE 1 is a perspective view of a complete drill embodying the invention;

FIGURES 2, 3 and 4 are partial elevations of the drill at different angles thereto;

FIGURES 5 and 6 are partial elevations of an alternative drill construction;

FIGURES 7, 8 and 9 are partial elevations at different angles of a further alternative drill construction; and FIGURES 10 and 11 are partial elevations at different angles of a still further drill construction.

A drill according to the present invention, as shown in FIGURE 1, comprises a shank 10 for attachment to a suitable drill press, or the like, and a cylindrical body 11 formed with a single helical flute 12. For drilling soft materials, the flute 12 is relatively deep and preferably extends inwardly beyond the axis of the drill body. The flute 12 extends throughout the full working length of the body completely to the cutting tip thereof so that the drill can be resharpened a relatively large number of times.

The cutting tip of the drill, as shown in FIGURES 1 to 4, is formed by grinding or otherwise forming across the end of the drill a flat planar surface, indicated at 13, which lies at an acute angle to the drill axis. The surface 13 is so positioned that it intersects the leading edge of the flute 12, i.e. the line of intersection between the flute surface and the outer surface of the drill body, at a point 14 which is advance of the axial outermost point of intersection 15 with the outer surface of the drill body. In this way, the flat surface 13 forms with the outer surface of the drill body a cutting spur terminating in the tip 15 which extends axially beyond any other part of the drill body and axially beyond the point 14.

In use of the drill, as it is advanced into the relatively soft fibrous or flaky material, the spur 15 will scribe the material and as the drill advances into the material the point 14 will pick up the scribed material and direct it smoothly into the flute 12 to be conducted away from the point of drilling. It is extremely important that the point 14 lead the outermost portion 15 of the cutting spur and that the cutting spur extend axially beyond the point 14 so that the material within the diameter of the drill body will be cut from the remainder of the material by the cutting spur and will be picked up by the point 14 and directed immediately and smoothly into the flute. It has been found that with this construction, clogging of the drill by the fibrous or flaky material is eliminated and that maximum wear of the drill is obtained. It will be apparent, of course, that after use the drill can easily be resharpened by regrinding the surface 13 in a very simple and rapid grinding operation and that the drill can be resharpened time after time until substantially the entire drill body has been ground away.

In the embodiment of FIGURES 5 and 6, all parts are identical with corresponding parts in FIGURES 1 to 4 and are indicated by the same reference numerals, with the exception of the cutting tip surface. In this instance, the end of the drill body is ground with a concave curve, indicated at 16, which intersects the leading edge of the flute 12 at a point 17 and defines a cutting spur 18 trailing the point 17 in the direction of rotation of the drill during cutting. This drill functions in the same manner as the drill of FIGURES 1 to 4 and is used in the same way.

Instead of forming the surface at the cutting tip of the drill as a continuous surface in the manner shown in FIGURES 1 to 5, it may be formed as a broken surface, as illustrated in FIGURES 7, 8 and 9. In this instance, the cutting tip of the drill is defined by a first flat surface 21 intersecting the leading edge of the flute at a point 22 and defining with the outer surface of the drill a cutting spur 23 trailing the point 22 and projecting axially beyond it. The surface 21 extends only partially across the diameter of the drill and joins a second surface 24 which extends across the remainder of the drill diameter at an angle to the surface 21. This drill functions in exactly the same manner as the drills of FIGURES 1 to 6, the surface 24 sloping away from its intersection with the surface 21 axially from the tip of the drill so that it will in no way interfere with the smooth flow of the cut out fibrous material picked up by the point 22.

FIGURES 10 and 11 illustrate another drill construction generally similar to that of FIGURES 7 to 9 except that the cutting point is formed by a first flat surface 25 at a very flat acute angle to the drill axis and a second surface 26 nearly perpendicular to the drill axis and extending across the major portion of the diameter of the drill body. The intersection of the surface 25 with the leading edge of the flute 12 defines a pick up point 27 and its intersection with the outer surface of the drill body defines an elongated thin cutting spur 28 trailing the point 27.

It has been found that the drill of FIGURES 10 and 11 works better in flaky material than the drills of the preceding figures since the cutting spur projects further beyond the pick up point and makes a deeper cut in the material before the scribed material is lifted by the point. The drills similar to FIGURES 1 through 9 operate more satisfactorily in fibrous material which does not require the same depth of cut before the cut material is picked up.

While several embodiments of the invention have been shown and described in detail it will be understood that these are illustrative only and are not to be taken as a definition of the scope of the invention, reference being had for this purpose to the appended claims.

What is claimed is:

1. A twist drill comprising a cylindrical body formed with a helical chip flute extending radially inwardly of the body at least to its axis and lengthwise to the cutting tip of the body, the cutting tip of the body being defined by a smooth continuous surface extending completely across the end of the body at an acute angle to the axis of the body and which intersects the leading edge of the flute surface of the body at a point angularly forward of the axially outermost intersection of said smooth continuous surface with the outer cylindrical surface of the body and at the periphery of the body, said smooth continuous surface defining with the outer cylindrical surface of the body a cutting spur extending axially beyond any other part of the body and the point of intersection of said smooth continuous surface with the leading edge of the flute surface lying axially beyond any part of the body except the cutting spur and serving to pick up material cut out by the cutting spur and direct it into the flute.

2. The twist drill of claim 1 in which the smooth continuous surface is concave along a line from its axially outermost to its axially innermost edge.

References Cited in the file of this patent

UNITED STATES PATENTS

| | | |
|---|---|---|
| 198,857 | Shaler | Jan. 1, 1878 |
| 404,197 | Irwin | May 28, 1889 |
| 2,675,841 | Einhiple | Apr. 20, 1954 |
| 2,792,862 | Emmons | May 21, 1957 |

FOREIGN PATENTS

| | | |
|---|---|---|
| 634,350 | Great Britain | Mar. 15, 1950 |